United States Patent [19]

Bourgeois et al.

[11] Patent Number: 4,839,522

[45] Date of Patent: Jun. 13, 1989

[54] REFLECTIVE METHOD AND APPARATUS FOR CURING INK

[75] Inventors: Robert A. Bourgeois, Orland Park; Phil Motev, Lincolnwood; Ronald M. Schmetter, Skokie, all of Ill.

[73] Assignee: American Screen Printing Company, Chicago, Ill.

[21] Appl. No.: 79,098

[22] Filed: Jul. 29, 1987

[51] Int. Cl.[4] ............................................ G01N 23/00

[52] U.S. Cl. .............................. 250/455.1; 250/453.1; 34/4

[58] Field of Search ............. 250/504 R, 492.1, 455.1, 250/453.1, 454.1; 34/4; 198/471.1

[56] References Cited

U.S. PATENT DOCUMENTS

| | | | |
|---|---|---|---|
| 3,983,039 | 9/1976 | Eastland | 250/504 R X |
| 4,010,374 | 3/1977 | Rambler | 250/504 R X |
| 4,055,769 | 10/1977 | Sander | 250/492.1 |
| 4,143,278 | 3/1979 | Koch, II | 34/4 X |
| 4,276,479 | 6/1981 | Mibu et al. | 250/504 R X |
| 4,309,388 | 1/1982 | Tenney et al. | 250/453.1 X |
| 4,434,562 | 3/1984 | Bubley et al. | 34/4 |
| 4,625,120 | 11/1986 | Caprari | 250/504 R |
| 4,685,762 | 8/1987 | Björnberg | 250/504 R X |

FOREIGN PATENT DOCUMENTS

| | | | |
|---|---|---|---|
| 2614849 | 10/1976 | Fed. Rep. of Germany | 250/504 R |
| 2529983 | 1/1977 | Fed. Rep. of Germany | 250/504 R |
| 3124335 | 1/1983 | Fed. Rep. of Germany | 250/504 R |

*Primary Examiner*—Eugene R. LaRoche
*Assistant Examiner*—Seung Ham
*Attorney, Agent, or Firm*—Fitch, Even, Tabin & Flannery

[57] ABSTRACT

Disclosed is an apparatus for curing ink on the exterior surface of an article preferably with ultraviolet radiation. A conveyor transports the article along an enclosed path within a housing having a wrap-around reflector which provides indirect stray light about the 360° circumference of the article. The interior reflective surface within the housing is preferably dimpled to cause the light to scatter in every direction and to provide indirect substantial uniform light intensity about the curcumference and the top of the article, i.e. uniform and indirect radiation over substantially the entire exposed surface of the article, without requiring rotation or other manipulation of the article. The preferred wrap-around reflector includes reflective specular surfaces on the front and rear walls of the housing as well as the corners of the housing where these walls join the side and top walls of the housing.

12 Claims, 3 Drawing Sheets

REFLECTIVE METHOD AND APPARATUS FOR CURING INK

The present invention relates generally to curing of ink on the exterior surfaces of various articles and in particular upright articles such as plastic containers, and more particularly to an improved apparatus and method for curing ultraviolet ink printed on such articles.

The method and apparatus disclosed herein may be used to cure ink on flat sheets rather than containers or other upright articles and also may be used to cure conventional inks with infrared radiation rather than ultraviolet radiation. While the invention is not limited to a particular ink or object to be cured, the invention will be described in connection with its most common usage which is the curing of ultraviolet ink screen printed on plastic containers. Typically, such containers are plastic and will be filled with shampoo, sun tan lotion, and other various products. Because the printed matter on these bottles frequently extends around the entire circumference of a portion of the bottle or is located at various locations on the circumferential area, and because it is desirable to cure the ink in a single step, a curing process should generally provide 360° exposure to ultraviolet radiation for each bottle.

Conventional systems for ultraviolet curing typically employ one or more ultraviolet lamps and a bottle handling or conveying mechanism which transports each bottle from an input station to a curing station, moves the bottle in a manner which exposes it to ultraviolet radiation on all sides, and transports the bottle to a delivery station. Quick and inexpensive curing is desirable, particularly on a mass production basis. The speed of the whole process is limited by the amount of exposure time required for each bottle and by the speed of the bottle handling mechanism. Insufficient exposure time results in incomplete curing of the ink. Excessive exposure time and excessive handling time decrease the rate at which the bottles may be processed, and in general, render the entire printing operation inefficient.

One type of existing system for curing ink-bearing articles uses an endless conveyor to carry the articles in a winding path past a series of ultraviolet lamps disposed at different orientations to expose overlapping areas on the article to ultraviolet. Each article is carried horizontally in a wire basket oriented parallel to the lamps, and the baskets are disposed at regular intervals along the conveyor. The basket wires may shade areas and result in uneven curing of ink because of uneven light distribution. In one particular system of this type, the lower portion of each article is irradiated through the bottom of its basket carrier as it passes over the first lamp, and the upper portion of the article is irradiated directly by the second ultraviolet lamp as the article passes beneath it. Due to the length of the path followed by the containers, machinery for processing of articles in this manner is rather bulky and the process itself is relatively slow. In addition, machines using this system with multiple ultraviolet lamps are relatively expensive.

Another known ultraviolet curing system employs a plurality of pins transversely mounted on an endless chain to carry tubular containers in a circuitous path about a single ultraviolet lamp while the containers are held stationary thereon and are oriented parallel to the pins. This process is also prohibitively slow for commercial high volume applications.

In another known ultraviolet curing system, articles are disposed in horizontal positions in baskets on a conveyor belt, with their axes perpendicular to their direction of travel, to be carried to a curing station where the articles are irradiated under an ultraviolet lamp. As each article arrives at the curing station, the belt stops and an article handling mechanism engages the opposite ends of the article to lift it, spin it, and then deposit it back in its basket. This process is relatively slow due to the intermittent nature of the conveyor belt motion and the time required for the article handling means to transfer the articles from and to the baskets and to begin and then stop the spinning cycle.

Another apparatus in use has a horizontal straight line conveyor for carrying the containers and has an endless belt traveling and engaging the containers to spin the containers about a vertical axis as the containers translate past an ultraviolet lamp. The belt engages the neck of the containers so as not to engage and smear the ink on the containers. However, some containers have small necks or no necks or even oval shaped necks making it difficult to engage the neck and to spin the container. Although cylindrical containers spin more readily on a vertical axis and present uniformly all areas on the cylindrical surface to the ultraviolet light source, many containers are oblong or elliptical or other shapes which do not expose the surface are uniformly to an ultraviolet lamp during a spinning movement. Some containers may be square in cross section. The bottles receive only limited area exposure because only the side of the bottle facing the ultraviolet lamp is exposed and hence longer exposure paths or times are needed to expose all areas sufficiently. When using a belt to engage container necks, there is a need for time consuming adjustments of the belt position for different container neck diameters and for different container neck heights. Also, many containers are shaped that do not readily spin about a vertical axis and tend to fall.

Another prior art device used to cure flat sheets or webs of paper or the like printed with ink has lamps mounted to direct ultraviolet light horizontally to inclined reflectors which directly reflect the ultraviolet light downwardly onto the sheet or web being conveyed therepast.

Some prior art devices have an ultraviolet lamp which is directed at one side of a container and has a reflector located at the opposite side of the container to reflect light received from the ultraviolet lamp onto the container surface opposite the lamp. The closely adjacent and directly exposed side of the container receives substantially more ultraviolet energy than does the side of the container receiving the directly reflected light. It is therefore, necessary to apply a second lamp and a second reflector to subsequently irradiate the container in order to achieve a more uniform exposure. However, the forward leading edge and the rear trailing edge receive little light. This results in uneven curing of the ink. Uneven curing of ink is a source of a problem of spotty or sporadic adhesion between a first cured ink coat on the container and a second subsequently applied ink coat. Thus, there may be sporadic intercoat adhesion between successively screen ink coats of different colors due to uneven curing of the ink of the first coat. Hence, there is a need for uniform or equalized curing of ink on articles of various shapes an sizes.

Cost of equipment and its maintenance cost are significant commercial realities as is the through put rate of the equipment. Heretofore, expensive container handling devices have been used as well as expensive and long conveyor mechanisms. Often such equipment requires a large number of ultraviolet lamps each of which generates heat and ozone and which must be replaced in time. Thus, there is a need for an improved ink curing method and system.

SUMMARY OF THE INVENTION

Accordingly, it is an object of the present invention to provide a new and improved curing apparatus for the irradiation of ink on the exterior surfaces of articles.

Another object of the present invention is to provide improved ultraviolet curing apparatus substantially free of article re-orientating devices or complex conveying paths for carrying the articles past several ultraviolet lamps for irradiating the ink on the articles.

Yet another object of the present invention is to provide an improved ultraviolet curing apparatus of the above-described type which is economically formed and simple in operation and relatively free of adjustments for handling various sizes and shapes of articles.

These and other objects of the present invention which will become apparent from the following detailed description and attached drawings of an ultraviolet curing apparatus for curing ink on the exterior surface of an article having upper, lower, and side exterior surfaces. The apparatus is comprised of at least one source of light radiation surrounded by a housing which defines an enclosed path for an article therethrough. A conveyor transports the article to be cured along the enclosed path so as to expose at least the vertical sides of the article. The housing has interior reflective surfaces for scattering the light and for reflecting and re-reflecting indirect light onto the substantial entirety of the exposed portion of the article's side surface as the article is transported along the path.

BRIEF DESCRIPTION OF THE DRAWINGS

In the drawings, wherein like elements are referenced alike.

DETAILED DESCRIPTION OF THE PREFERRED EMBODIMENT

Figure 1:
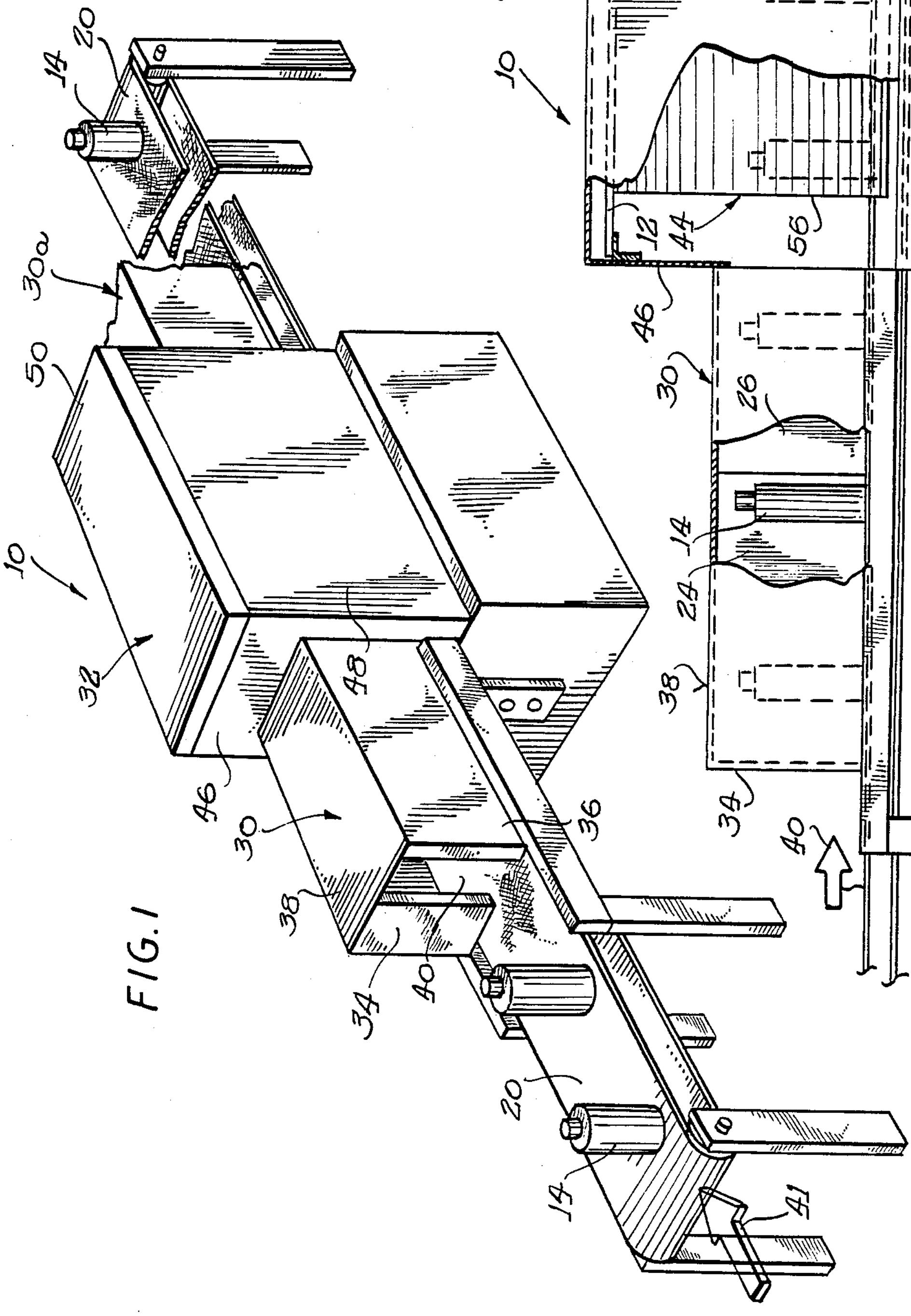
FIG. 1 is a perspective view of an ultraviolet curing apparatus embodying the present invention.

As shown in the drawings for purposes of illustration, the present invention is embodied in an apparatus 10 for curing ink on the exterior surfaces of articles by exposing them to ultraviolet radiation. Preferably, the ultraviolet radiation is economically provided by a single lamp bulb 12. Apparatus 10 includes an endless conveyor means, preferably in the form of an endless linear belt 20 for carrying a spaced series of articles which, as illustrated in the drawings, are plastic bottles having cylindrical bodies, but may comprise a variety of different types of articles having varying shapes and made from varying materials. The material of the conveyor means belt could be made of reflective material, or have an upper reflective surface, but such was not found to be necessary in the embodiment illustrated here.

In accordance with one aspect of the present invention, the articles 14 may be conveyed continuously and quickly on the conveyor means 20 in a simple, generally straight-line path past the ultraviolet radiation source. Preferably, the lamp bulb providing the source of ultraviolet radiation is elongated in the direction of the articles' travel to provide the desirable exposure time with a relatively fast-moving conveyor means. Except for the endless belt 20, the apparatus 10 has relatively few and preferably no other moving parts. As will be seen, in order to accomplish the necessary curing of the entire exposed surface of the article being cured, the present invention provides, in one of its aspects, a unique reflective chamber 44 which has reflective surfaces which scatter and reflect and re-reflect the light from the radiation source to provide indirect light completely around the 360° circumference of the article and over the upper surfaces of the article without requiring a tortuous path, or any mechanized re-orientation of the article, such as by spinning or other rotational movement. Preferably, the article receives no direct exposure to the light source so that all surfaces receive only reflected and indirect light of substantial uniform intensity to provide uniform ink curing. Further, there is no need to reposition article handling or article spinning belts when changing between different sizes or shapes of containers as in prior devices. Also, the present invention affords a unique advantage in curing articles whose construction or nature of the contents carried therein require minimal motion during the curing process.

An inlet light trapping means in the form of an enclosed tunnel is provided immediately upstream of the reflective curing chamber 32 and a similar light trapping tunnel 30*a* is provided immediately downstream of the curing chamber. It has been found that only two internal baffling plates or walls 24 and 26 are needed in the light trapping tunnels to prevent the escape of ultraviolet light from the interior of the curing chamber 32 to the area surrounding the entrance tunnel 30, where employees might be stationed, for example, to load a series of containers 14 on conveyor means 20. If desired, interior surfaces of the entrance tunnel 30 can be provided with a non-reflective coating to further trap ultraviolet energy. The entrance tunnel 30 includes a front wall 34, side walls 36 and a top wall 38 to provide a substantially complete enclosure about the upper surface of conveyor means 20. As illustrated in FIG. 1, front wall 34 has formed therein an opening 40, dimensioned to receive articles 14. In the preferred embodiment, opening 40 is located to one side of conveyor means 20 which is illustrated as the right-hand side when looking in the direction of product feed designated by the arrow 41.

Figure 3:
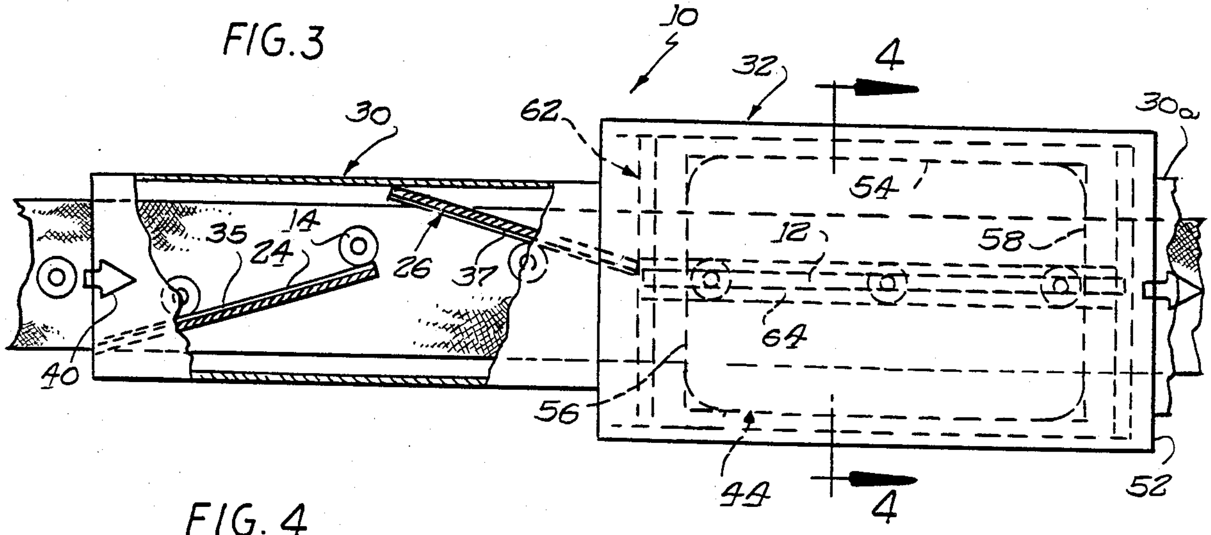
FIG. 3 is a top plan view of the apparatus of FIGS. 1 and 2.

With reference to the top plan view of FIG. 3, the upstream baffle wall 24 deflects the incoming articles 14 toward the opposite, left-hand side of conveyor means 20, the deflection occurring primarily due to the translational, non-rotational motion imparted to article 14 by the conveyor means 20. To provide minimal contact with the exterior side surface of article 14 as the article is deflected in a lateral direction, a laterally projecting flange 35 projects outwardly from the lower edge of the baffle wall 24 to engage the lower edge only of the article adjacent the base of the article resting on the conveyor belt. As article 14 passes the downstream end of baffle wall 24 it reaches a point of maximum lateral deflection. Thereafter, article 14 continues in the downstream direction of arrow 41 a short distance before contacting a similar flange 37 on the lower edge of the downstream deflector wall 26. Under the motion of conveyor means 20, the article 14 is gradually deflected in a reverse lateral direction toward the center of conveyor means 20 as it slides along the flange 37 on the downstream baffle wall 26, located at the entrance to the curing chamber 32. The baffles 24 and 26 are located so that the light cannot travel a straight line path from the curing chamber 32 to the eyes of a person looking in the entrance tunnel. The baffle walls are preferably of substantial length and deflect the containers gradually in the transverse direction across the belt. When shorter baffle walls were used, the containers tend to slow down in their forward travel and to abut one another and smear ink. Thus, the longer baffle walls allow higher production rates. By way of example only, the illustrated inlet tunnel is 55 inches in length. The containers 14, located at the approximate center of conveyor means 20, are no longer contacted on their side surfaces as they travel through the remainder of the curing apparatus 10.

Figure 2:
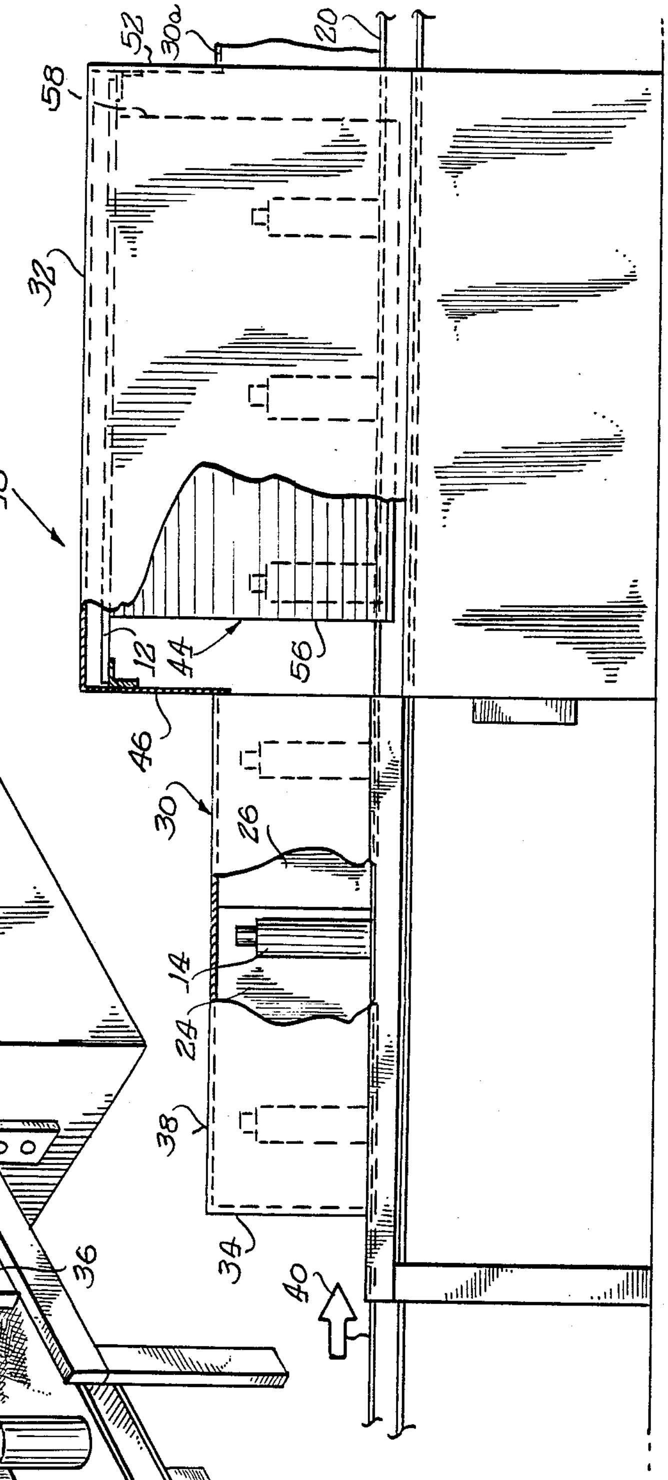
FIG. 2 is a side elevational view of the apparatus of FIG. 1, shown partially broken away.

Preferably, as indicated in FIG. 2, the baffle walls 24, 26 extend the full height of entrance chamber 30, extending generally above the containers 14. The light tunnel may take different forms and shapes from that illustrated herein.

Also, the entrance tunnel with the interior baffle walls 24, 26 is provided only as an accommodation to personnel that may be working nearby, and is not strictly necessary for curing the ink deposited on outer surfaces of the containers. Accordingly, if the curing apparatus 10 of the present invention is operated in a fully automated mode remote from human contact, the entrance and exit tunnels may be eliminated. A similar exit tunnel **30*a*** is provided and is of the same construction as the inlet tunnel and need not be described in detail.

After passing through entrance tunnel 30, articles 14 are carried through the length of the curing section 32 where curing of the ink takes place. In the preferred embodiment, the curing section 32 includes a reflective chamber 44 within a protective housing including front, side and top walls 46, 48 and 50, respectively, which protect the reflective chamber. Additionally, curing section 32 further includes a rear wall 52, seen most clearly in FIG. 4. According to one aspect of the present invention, the reflective chamber 44 is provided with uniquely configured reflective surfaces to scatter, reflect and re-reflect the light to provide a light bath of substantially uniform intensity about all sides of the article and thereby provide an improved and uniform curing with a single source of ultraviolet radiation, without requiring re-orientating or other manipulation of the ink-bearing articles being cured.

Figure 5:
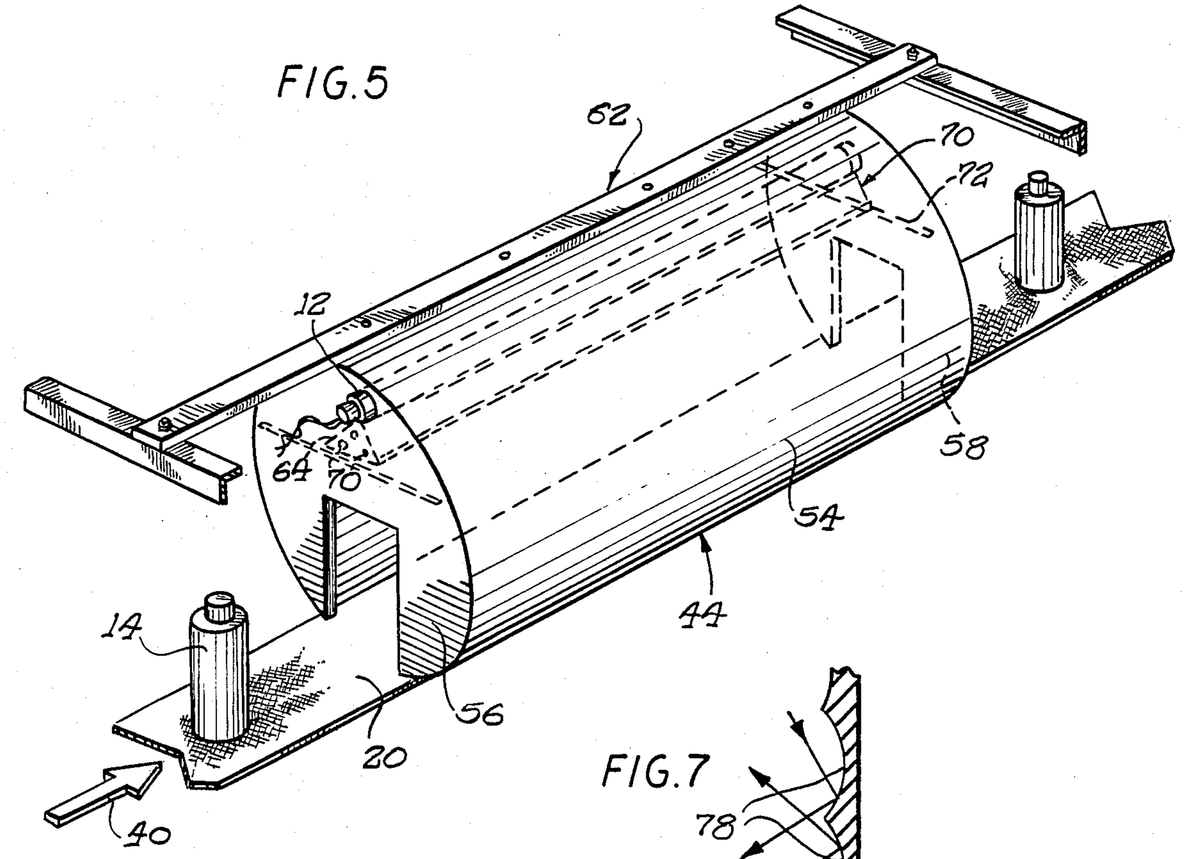
FIG. 5 is a fragmentary perspective view of the apparatus of the preceding FIGS. showing the reflective chamber thereof in greater detail.
Figure 7:
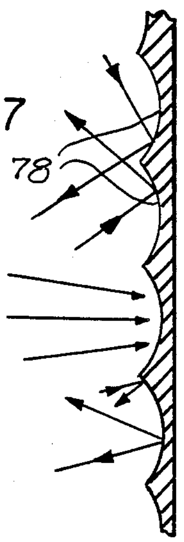
FIG. 7 is a cross-sectional view taken generally along the line 7—7 of FIG. 6 and looking in the direction of the arrows.

Referring now to FIG. 5, the preferred wrap-around reflective chamber 44 includes a generally cylindrical section comprising a hollow, cylindrical sidewall 54 enclosed at upstream and downstream ends by generally circular endwalls 56, 58, respectively. The endwalls each have a passageway for receiving the articles 14, preferably with a minimal clearance so as to reduce the escape of curing radiation. Also shown in FIG. 5 is a supporting superstructure generally indicated at 62, from which the enclosing outer walls 46, 48, 50 and 52 are suspended. The illustrated reflective chamber is easily removable from the housing for replacement of a bulb or access to the interior of the reflective chamber by inverting the chamber from the position of FIG. 5. As will be seen, the reflective chamber 44 is fully functional without the surrounding outer walls 46, 48, 50 and 52, and those outer walls are not necessary to provide baffling for the ultraviolet light radiating from within the reflective chamber, since the upstream entrance chamber 30 is joined to the upstream wall 56 so as to completely enclose the article-receiving opening formed therein.

Figure 4:
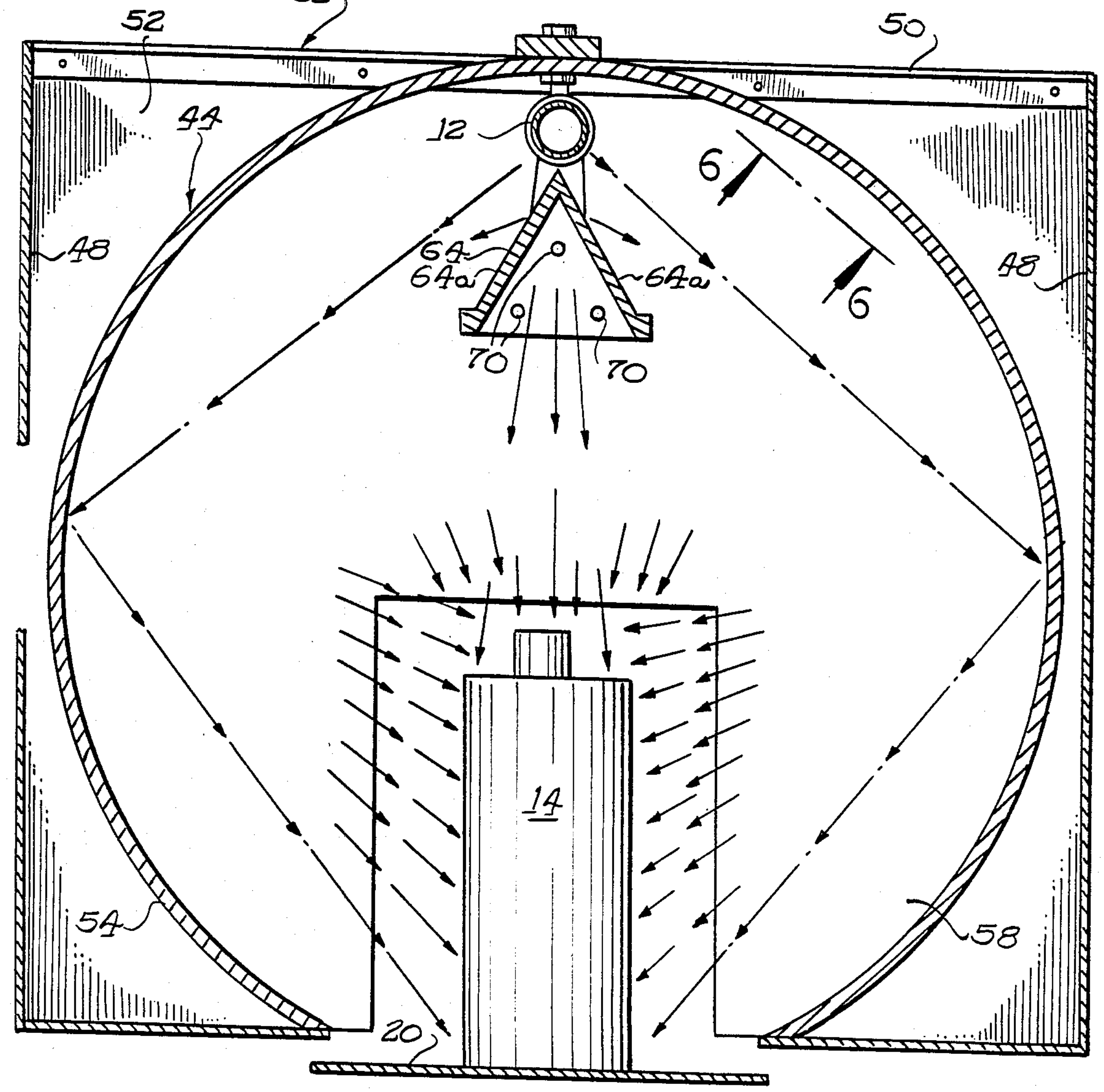
FIG. 4; is an enlarged cross-sectional view taken generally along the line 4—4 of FIG. 3 and looking in the direction of the arrows.

As shown in FIGS. 4 and 5, the hollow cylindrical sidewall 54 of the reflective chamber is generally truncated at its bottom or lower end with the conveyor means 20 being disposed therebelow. If desired, the cylindrical sidewall 54 need not be truncated, and the conveyor means 20 can extend through appropriate openings formed in the upstream and downstream endwalls 56, 58 of the reflective chamber. However, the relative positioning between the ultraviolet lamp 12, the configuration of the cylindrical sidewall 54, and the relative positioning of articles 14 therein, as illustrated in FIG. 4, is important for bathing the exposed outer surface of articles 14 (except for the bottom surface thereof) with indirect reflected radiation on all but the bottom sides of the article. For example, as seen most clearly in the cross-sectional view of FIG. 4, the entire article 14 is located below the horizontal mid-section of the cylindrical sidewall 54, and the width of article 14 is approximately 20 percent of the diameter of the cylindrical sidewall 54.

The ultraviolet lamp bulb 12 is suspended from the top of reflective chamber 44 at either end thereof, by grid-like supporting structures 70, 72 comprising open framework located at the upstream and downstream ends of the reflective chamber, respectively. Accordingly, substantially the entire length of lamp bulb 12 is unblocked by any structure required to support its weight. The illustrated lamp is twenty five inches in length, but any length of the lamp may be used. The reflector may be positioned beneath the lamp bulb at any desired position, as will be discussed herein. As shown most clearly in FIG. 4, lamp bulb 12 is preferably positioned very close to the uppermost portion of reflective chamber 44. To eliminate an over-exposure to the top of article 14 which would be caused by direct radiation, and to more efficiently spread the radiation of lamp 12 over the internal surface of reflective chamber 44, a reflector 64 may be disposed immediately below lamp 12. The preferred reflector is illustrated in the Figures as an inverted V-shaped reflector 64 which extends over the length of bulb 12. Best results have been obtained when the included angle between side walls **64*a* of the reflector is 57°. The ends of reflector 64 are supported by and fastened by fasteners 70 to end walls 58 and 60 such that the apex of the reflector is slightly spaced from the surface of bulb 12 to provide the desired focusing. Other reflector shapes, generally convex when viewed from the center of bulb 12 are, of course, possible to provide low loss dispersion throughout the interior of reflective chamber 44**.

The reflective wrap-around chamber 44 is designed to reflect light rays in diverse directions from one point to the next point about the cylindrical surface wall and the end walls; and because the preferred wall is a specular reflective surface of a generally dimpled or pebbled form, the light rays are bounced in various directions and angles from these walls so that the light is stray light or reflected light rather than direct, non-reflect light. Preferably, the end walls 56 and 58 are also covered with the pebbled reflective surface and diffuse and re-reflect light toward the front and rear sides of the article traveling through the chamber while the cylindrical sidewalls are reflecting light rays to the closely adjacent lateral sides of the article as well as to the front and rear walls. It has been found that more uniform curing is accomplished when the front and rear walls of the chamber are reflective as the ink on the leading and trailing sides of the article are not sufficiently or uniformly cured as are the lateral sides facing the cylindrical wall if the front and rear end walls are not reflective. Also, it has been found that more irradiation is achieved if the corners or junctures of the end walls and the cylindrical wall are curved and wrapped to eliminate the 90° corner and provide a smooth curved radius surface between the cylindrical surface and the central vertical surfaces of the end walls. That is, the corners are wrapped to provide a smooth transitional curved, pebble specular surface between the cylindrical wall and the front and rear end wall. As will be explained in greater detail, the entire surface area of the container except for the bottom container surface resting on the conveyor belt is uniformly irradiated with the indirect light and no direct light from the light source hits the article, although some directly radiated light could be so directed if so desired.

A particular advantage of the curing apparatus according to the present invention is that the entirety of the article's exposed surface, especially the sidewalls of upright elongated articles such as the plastic bottles illustrated in the Figures are completely and uniformly irradiated irrespective of the container shape in a very compact apparatus which affords heretofore unattained curing efficiency while providing very attractive rates of throughput for articles being processed by the curing apparatus. The wrap-around chamber provides an elongated light tunnel in which the light is reflected to provide a uniform bath of light to all of the sides of the article except the base which is resting on the conveyor belt. The essentially straight line travel of the conveyor without baskets and the use of a single bulb make for an inexpensive and compact curing unit.

Figure 6:
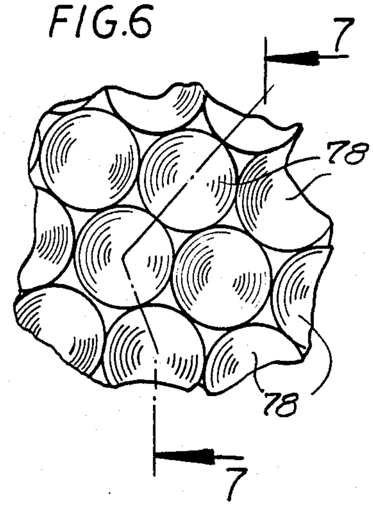
FIG. 6 is a fragmentary interior view of the reflective chamber of the preceding Figures taken generally along the line 6—6 of FIG. 4 and looking in the direction of the arrows.

Referring now to FIG. 6, one important aspect of the present invention is that the interior surfaces of the reflective chamber 44 have specular reflective surfaces characterized by a generally "pebbled" or dimpled appearance arising from of a plurality of generally concave recesses or depressions 78 which are in a random and non-uniform arrangement. In particular, the recesses 78 formed in the interior of the reflective chamber are important for the successful curing of a wide variety of ink-bearing articles in a commercial environment, and are thought to provide at least two advantages, namely an intensity-averaging specular reflective diffusion of the ultraviolet radiation emanating from lamp 12, and the scattering of light in every direction. That is, light rays hitting different portions of the same concave pebble will be scattered in a number of various directions and each reflected ray will hit a different pebble somewhere else in the chamber and again be reflected. Thus, the light from the bulb is strayed or scattered to go about to the corners or ends of the chamber and is reflected back from these endwalls so as to direct curing radiation on portions of the article's exterior surface which would otherwise be "hidden", thereby failing to receive the desired curing radiation. Since, in the preferred embodiment, all radiation received by article 14 is indirectly reflected thereon, it is important that the interior surface of reflective chamber 44 have a sufficiently high spectral reflectance, at least as great as 80%, and preferably as great as 90% or more. That is, the surface is very polished and shiny with only 10% to 20% of the light being absorbed and most of the light energy bouncing off intact. Further, as explained above, it is important that the internal surface of reflective chamber 44 be non-smooth, preferably dimpled for a reflective chamber which is 30 inches long and 18 inches in diameter, with an inlet opening 12 inches in height. One material providing the desired reflectance is available from Kingston Industries as White Lake NV 12786 metal reflective stock.

Other reflective materials can be substituted, although smooth planar reflective surfaces will not cause the light scattering or straying sufficiently from a single ultraviolet source to uniformly distribute curing radiation throughout the chamber interior. Planar reflective surfaces tend to concentrate the radiation at specific areas on the articles rather than substantially uniformly about the article. Of course, if the ink to be cured is located in a well-defined, narrow areas on lateral portions of the article's circumference, smooth reflective material would be used. However, the non-smooth reflective material is used to provide a curing apparatus which did not have directional characteristics and could, accordingly, treat any exposed portion on a wide variety of exterior configurations, especially the leading and trailing sides of the articles.

Figure 8:
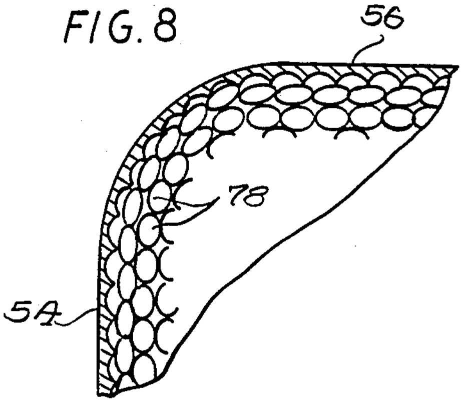
FIG. 8 is an enlarged partial cross-sectional plan view of a corner portion of the reflective chamber of FIG. 3 as indicated by the broken circle shown therein.

Other important features of the present invention ensuring complete and substantially uniform intensity coverage of any article's exposed surface include the reflective end walls described above and the corner constructions where the end walls meet the cylindrical sidewall 54. Referring now to FIG. 8, an enlarged fragmentary view of a corner of reflective chamber 44 is illustrated. The particular corner shown is formed between the upstream right circular endwall 56 and the cylindrical sidewall 54. As is evident from the enlarged view of FIG. 8, the corner formed between the endwall and sidewall is rounded on its interior side so that light incident on the corner from bulb 12 is reflected toward an article 14 passing through the reflective chamber. In particular, the corner illustrated in FIG. 8 is configured to direct curing radiation onto the trailing side of article 14, that side generally pointed to by the arrow 40 of FIG. 5. The endwall and corner constructions of reflective chamber 44 play an important role in insuring that substantially the entire exterior surface of article 14 (excluding its bottom surface and contact with conveyor 20) receives the necessary amount of curing radiation. In particular, for example, as an article 14 approaches reflective chamber 44, passing through the aperture formed in upstream circular wall 56, its leading surface receives indirect radiation reflected from ultraviolet lamp 12. The opposite trailing portion of article 14 is however shadowed by the article during its initial entrance into the reflective chamber 44. With continued movement through the reflective chamber, the article 14 receives radiation on its lateral sides by the circular sidewall 54, as the leading edge of the article continues to receive radiation. After the article passes a short distance into reflective chamber 44, the trailing surface of the article begins to receive radiation from the cylindrical sidewall 54 along with radiation reflected from endwall 56 and the corner reflectors. As the article approaches the opposite downstream end of the reflective chamber, its leading surface continues to receive radiation reflected from endwall 58 and its adjacent corner reflectors. Throughout movement through the wrap-around reflective chamber 44, the article is bathed in indirect, reflective light of substantially uniform intensity.

It is preferred that the reflective chamber be elongated in the direction of conveyor travel and that the ultraviolet source also be elongated along the path that an article takes when traveling through the reflective chamber to allow appreciably faster conveyor speeds. Manifestly, the time in the chamber and the intensity of the light source are factors in the production speed and in achieving a good cure for the ink.

The endwalls 56, 58 of the reflective chamber could be blended into sidewall 54 to form a generally ovoid or football-shaped reflective chamber. To meet demands of closely spaced surrounding equipment, for example, the conveyor means 20 could comprise a turntable. The source of ultraviolet radiation could comprise several lamps at different locations or an array of shorter lamps arranged end to end.

While the curing apparatus of the present invention can be used with generally flat, planar articles such as sheets of paper or textile goods, the advantages of many aspects of the present invention are particularly important for those articles having side surfaces of significant dimension, for example, the upright cylindrical bottles illustrated in the Figures, which also have top surfaces including a cap providing access to the interior of the bottle. Of course, the embodiments of the present invention can also be used with other configurations, such as generally spherical articles which, while technically having a single exterior surface, may be said to have upper, lower and side portions for the purpose of explaining the isotropic coverage and other aspects of the present invention.

Conventional inks are cured with heat and infrared radiation rather than ultraviolet radiation. The usual ultraviolet lamp source also emits energy in the I R range and the method and apparatus disclosed herein could be used to cure conventional inks on articles.

From the foregoing it will be seen that the present invention provides a new and improved ink curing system for curing of ink on the exterior surfaces of articles such as plastic bottles, by reflecting more uniformly light on otherwise "hidden" or shadowed portions of the articles, while transporting the articles past ultraviolet lamps. The path of travel is short and a plurality of bottles may be exposed simultaneously. The apparatus may be simpler and less expensive than the basket conveyors and non-spinning systems heretofore used. The preferred embodiment is illustrated with a belt-like conveyer means placed underneath the articles to support them from below and to expose all of each article's side exterior surface. The conveyor means could be made to block some of the article's side surface if the blocked portion was previously coated with a ultraviolet-sensitive coating, for example. It was not of particular concern to cure any ink printed onto the bottom portion of the article—that portion in contact with the conveyor. However, such can be readily accommodated by the present invention. For example, a different type of conveyor, one having fingers gripping an outward protrusion adjacent the top of the article could be used to expose the bottom portion of the article. The gripping fingers could be supported from above by a thin rail or guide wire, or from the sides by a pair of parallel tracks. Rather than block the bottom portion of the article as in the illustrated embodiment, these latter arrangements would expose the bottom portion of the article to curing radiation, using a reflective chamber extending underneath the article.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A curing apparatus for curing ink on the exterior surface of an article having upper, lower, and said exterior surfaces, the apparatus comprising:

at least one source of light radiation;

a housing surrounding the source of light radiation and defining an enclosed path for an article therethrough;

said housing including a tunnel-shaped wall and having entrance and exit walls substantially closing an entrance to and an exit from said housing;

a conveyor transporting the article along the enclosed path at a predetermined rate of speed so as to expose at least a portion of the article's side surface to the interior of the housing; and said housing having interior reflective surfaces on said tunnel-shaped wall and on said entrance and exit walls for reflecting and scattering the light to provide indirect and substantially uniform indirect light radiation onto the substantial entirety of the exposed portion of the article's side surface to cure ink thereon as the conveyor travels as said predetermined rate of speed.

2. The apparatus of claim 1 wherein said housing tunnel has a generally cylindrical interior reflective surface with generally right circular opposed endwalls defining said entrance and said exit, respectively.

3. The apparatus of claim 1 wherein said conveyor transports a series of spaced articles with a translational non-rotational motion through said housing.

4. The apparatus of claim 1 wherein said articles has an elongated body generally upstanding from said conveyor, and said conveyor exposes substantially the entire portion of the article's side surface.

5. The apparatus of claim 1 wherein said housing interior reflective surface has a plurality of generally concave recesses each of which reflects light at various stray angles to other generally concave recesses.

6. The apparatus of claim 1 further comprising reflector means disposed between said source of ultraviolet radiation and said conveyor which reflects ultraviolet radiation onto said interior reflective surface and prevents direct light from the source from impinging on the article.

7. A method of curing ink on an exterior surface of an article having upper, lower and side exterior surfaces by exposing the article to curing light comprising the steps of:

providing at least one source of light radiation;

providing a housing having an entrance wall normal to the path of article travel with a reflective interior surrounding the source of light radiation to reflect light forwardly and having a surrounding interior wall to reflect light toward the conveyor and an exit wall normal to the conveyor path to reflect light rearwardly, thus defining an enclosed path for an article passing therethrough;

positioning the article on said enclosed path so as to expose exterior surfaces on the article to said housing reflective interior; and scattering and reflecting light from the light source forwardly and rearwardly as well as substantially circumferentially to provide indirect light from and about the circumference of the article and onto substantially and entire exposed, exterior surfaces on the article to cure the ink on the exposed surfaces.

8. The method of claim 7 wherein the article is continuously conveyed along said path with a translational non-rotational movement.

9. The method of claim 7 wherein said scattering and reflecting step includes directing radiation form said source to generally concave recesses on reflective interior which reflect a portion of said radiation to other areas of said housing reflective interior for re-reflection so that substantially the entire exposed portion of the article's side exterior surface receives curing radiation.

10. An ultraviolet curing apparatus for curing ink on upright articles being conveyed through a curing chamber, said apparatus comprising:

a conveyor for conveying articles resting on the conveyor through the curing chamber with the articles having a leading side in the direction of conveyor travel and a trailing side with lateral sides between the leading and trailing sides, a reflector between said ultraviolet light source and the articles for reflecting light emanating from a light source to prevent direct light radiation of the articles from the ultraviolet light source, an overhead spectral reflective surface in the curing chamber for reflecting light down onto the top of the articles, front and rear reflective surfaces in the curing chamber for reflecting ultraviolet light forwardly and rearwardly onto the front and trailing sides of the article, and lateral side spectral reflective surfaces in the curing chamber for reflecting ultraviolet light substantially circumferentially from the ultraviolet light source onto the lateral sides of the article.

11. An apparatus in accordance with claim 10 in which said overheat reflective surface is joined by curved surfaces to the respective lateral side reflective surfaces to define a substantially cylindrical surface extending longitudinally of the conveyor, the front and rear reflective surfaces extending transversely of the conveyor.

12. An ultraviolet curing apparatus for curing ink on the exterior exposed surface of an article, the apparatus comprising:

at least one source of ultraviolet radiation;

a housing surrounding the source of ultraviolet radiation and defining an enclosed path for an article therethrough;

a conveyor transporting the article along the enclosed path so as to expose at least a portion of the article within the interior of the housing; and a wrap-around reflector in said housing having light reflecting and light scattering surfaces thereon for scattering the light forwardly and rearwardly from entrance and exit end walls and about the exposed surface with a substantial uniform intensity, said wrap-around reflecting surface having a highly spectral dimpled surface to scatter and reflect light at various angles.

* * * * *

UNITED STATES PATENT AND TRADEMARK OFFICE

CERTIFICATE OF CORRECTION

PATENT NO. : 4,839,522

DATED : June 13, 1989

INVENTOR(S) : Bourgeois, Motev, Schmetter

It is certified that error appears in the above-identified patent and that said Letters Patent is hereby corrected as shown below:

Title page:

In the Abstract: Column 00, Line 11, change "curcumference" to --circumference--.

Column 10, Line 55, change "articles" to --article--.

Column 11, Line 21, change "and" to --the--.

Column 12, Line 17, change "overheat" to --overhead--.

Signed and Sealed this

Sixth Day of March, 1990

*Attest:*

JEFFREY M. SAMUELS

*Attesting Officer*

*Acting Commissioner of Patents and Trademarks*